(12) United States Patent
Kristiansen et al.

(10) Patent No.: US 7,469,652 B2
(45) Date of Patent: *Dec. 30, 2008

(54) DEFLECTOR DEVICES

(75) Inventors: Ottar Kristiansen, Oslo (NO); Philippe Hocquet, Vanves (FR); Emmanuel Keskes, Nantes (FR); Philipe Saint-Pere, Castelnau de Medoc (FR)

(73) Assignee: WesternGeco L.L.C., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/381,452

(22) PCT Filed: Sep. 26, 2001
(Under 37 CFR 1.47)

(86) PCT No.: PCT/IB01/01758

§ 371 (c)(1),
(2), (4) Date: Jun. 28, 2005

(87) PCT Pub. No.: WO02/30736

PCT Pub. Date: Apr. 18, 2002

(65) Prior Publication Data

US 2007/0095270 A1    May 3, 2007

(30) Foreign Application Priority Data

Sep. 28, 2000 (GB) ................................ 0023755.2
Oct. 20, 2000 (GB) ................................ 0025711.3
Nov. 30, 2000 (GB) ................................ 0029452.0

(51) Int. Cl.
*B63G 8/22* (2006.01)

(52) U.S. Cl. .................. 114/245; 114/244; 114/253

(58) Field of Classification Search .................. 114/242, 114/245, 246

See application file for complete search history.

(56) References Cited

U.S. PATENT DOCUMENTS

| 3,372,666 | A   |   | 3/1968 | Baker |
| 5,357,892 | A   |   | 10/1994 | Vatne et al. |
| 5,532,975 | A   | * | 7/1996 | Elholm ........................ 367/16 |
| 6,877,453 | B2  | * | 4/2005 | Hocquet et al. ............. 114/244 |

FOREIGN PATENT DOCUMENTS

| EP | 0 562 780 | 9/1993 |
| EP | 0 613 025 | 8/1994 |
| WO | WO 98/25162 | 6/1998 |
| WO | WO 99/33700 | 7/1999 |

OTHER PUBLICATIONS

International Search Report dated Mar. 4, 2002, for International Application No. PCT/IB01/01758.
UK Search Report dated Dec. 6, 2000, for Application No. GB 0023755.2.

* cited by examiner

*Primary Examiner*—Jesus D Sotelo
(74) *Attorney, Agent, or Firm*—Jeff L. Wendt; Liangan (Mark) Ye; Jeffrey E. Griffin

(57) ABSTRACT

A deflector device (22) for use with a tow lie between a towing vessel (10) and a tow (16) in water behind the vessel, the device comprising a principal wing-shaped body (28) shaped to produce in use a sideways force which urges the tow line (16) laterally with respect to the direction of movement of the towing vessel, a boom (32) extending rearwardly from the principal wing-shaped body (28), and an auxiliary wing-shaped body (52), smaller than the principal wing-shaped body (28), secured to the end of the boom (32) remote from the principal wing-shaped body (28) and shaped so as to produce in use a sideways force in generally the opposite direction to that produced by the principal wing-shaped body (28).

15 Claims, 4 Drawing Sheets

0° angle of boom

0° angle of boom

10° angle of boom

20° angle of boom

DEFLECTOR DEVICES

This invention relates to deflector devices of the kind used between a towing vessel and a tow located in water, for example a seismic streamer or streamer array, or a seismic source array, in order to pull the tow out to one side of the vessel, so as to position it at a desired lateral offset from the course followed by the vessel.

A deflector device of this kind is described in detail in our U.S. Pat. No. 5,357,892, and comprises a wing-shaped deflector body having a remotely-operable pivotal lever or "boom" which extends rearwardly from a point near the middle of the trailing edge of the wing-shaped body. In use, the wing-shaped deflector body is suspended beneath a float so as to be completely submerged and positioned generally vertically in the water, and is connected to the towing vessel by means of a tow line, while the tow is connected to the end of the boom remote from the wing-shaped body. As the device is pulled through the water, the wing-shaped body produces a sideways force, or "lift", which moves the tow laterally. This lift can be varied by adjusting the angle of the boom from the vessel, thus permitting the lateral offset of the tow from the course of the vessel to be varied in use.

The deflector device of U.S. Pat. No. 5,357,892 has been successfully commercialised by the Applicant as its MONOWING deflector device. In use, rolling stability of the device is provided by the connection to the float, while stability of the device about a vertical axis is provided by the drag produced by the tow. However, under certain circumstances, eg in bad weather, at low towing speeds and when towing relatively short streamers, the drag produced by the tow can vary and/or become too low, to an extent greater than is desirable for stability purposes. It is an object of the present invention to alleviate this problem.

As already mentioned, the lift produced by the deflector device of U.S. Pat. No. 5,357,892 is varied by varying the angle of the boom attached to the wing-shaped body. This is achieved in current versions of the MONOWING deflector device by means of a hydraulic system which is disposed within the wing-shaped body, and which operates a telescopic actuator strut connected between the wing-shaped body and the boom to pivot the boom towards or away from the wing-shaped body. It is another object of the present invention, in one of its preferred embodiments, to provide a simpler and less power-consuming mechanism for varying the lift produced by the deflector device.

According to the present invention, there is provided a deflector device for use with a tow line between a towing vessel and a tow in water behind the vessel, the device comprising a principal wing-shaped body shaped to produce in use a sideways force which urges the tow line laterally with respect to the direction of movement of the towing vessel, a boom extending rearwardly from the principal wing-shaped body, and an auxiliary wing-shaped body, smaller than the principal wing-shaped body, secured to the end of the boom remote from the principal wing-shaped body and shaped so as to produce in use a sideways force in generally the opposite direction to that produced by the principal wing-shaped body.

In a first implementation of the invention, the device further comprises remotely-operable means for adjusting the angle between the boom and the principal wing-shaped body to vary the sideways force produced by the principal wing-shaped body. In this case, the auxiliary wing-shaped body is preferably secured to the boom at or near its trailing edge, with its chord extending outwardly from the boom, on the side thereof opposite to the principal wing-shaped body, at an angle to the boom substantially equal to half the angle through which the boom is adjustable. Also, the remotely-operable means preferably includes a hydraulically-actuated telescopic strut.

In a second and preferred implementation of the invention, the angle between the boom and the principal wing-shaped body is substantially fixed, and the device further comprises remotely-operable means for varying the angle of the auxiliary wing-shaped body to vary the sideways force produced by the auxiliary wing-shaped body, and thereby vary the sideways force produced by the principal wing-shaped body. In this case, the remotely-operable means may comprise an electric motor or a hydraulic actuator.

Advantageously, the auxiliary wing-shaped body is provided with a trailing edge flap angled away from the boom, typically at about 35°.

The invention also includes a method of performing a marine seismic survey, the method including towing a plurality of laterally spaced seismic streamers over an area to be surveyed, wherein the lateral position of at least one of the streamers is controlled by a deflector device in accordance with any one of the preceding statements of invention.

The invention will now be described by way of example only, with reference to the accompanying drawings, of which:

Figure 1:
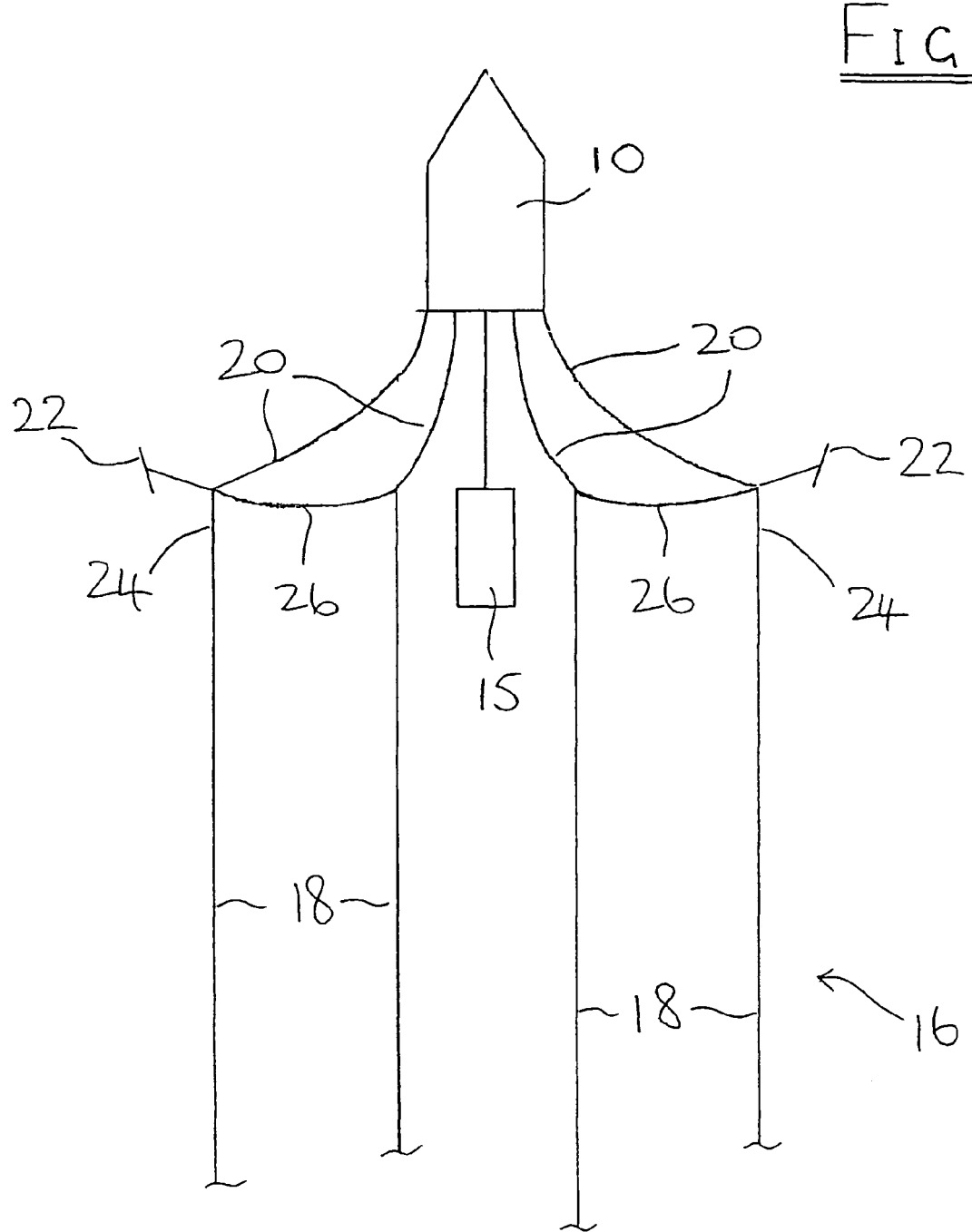
FIG. 1 is a partial schematic view of a seismic survey vessel carrying out a marine seismic survey.

The seismic survey vessel shown in FIG. 1 is indicated generally at 10, and is preferably as described in our PCT Patent Application No. PCT/GB98/01832 (WO 99/00295). The vessel 10 is shown towing a seismic source 15, typically a TRISOR multiple air gun source of the kind described in our U.S. Pat. No. 4,757,482, and an array 16 of four substantially identical streamers 18. However, it will be appreciated that, in practice, many more than four streamers can be towed, for example by using the techniques described in our PCT Patent Application No. PCT/IB98/01435 (WO 99/15913). The streamers 18 are towed by means of their respective lead-ins 20 (ie the high strength steel- or fibre-reinforced electrical or electro-optical cables which convey electrical power, control and data signals between the vessel 10 and the streamers), and their spread is controlled by two deflector devices, indicated at 22, connected to the respective forward ends 24 of the two outermost streamers. The deflector devices 22 are suspended from respective floats (not shown), and act in co-operation with respective spreader lines 26 connected between the forward end 24 of each outermost streamer 18 and the forward end 24 of its adjacent streamer to maintain a substantially uniform spacing between the streamers.

Figure 2:
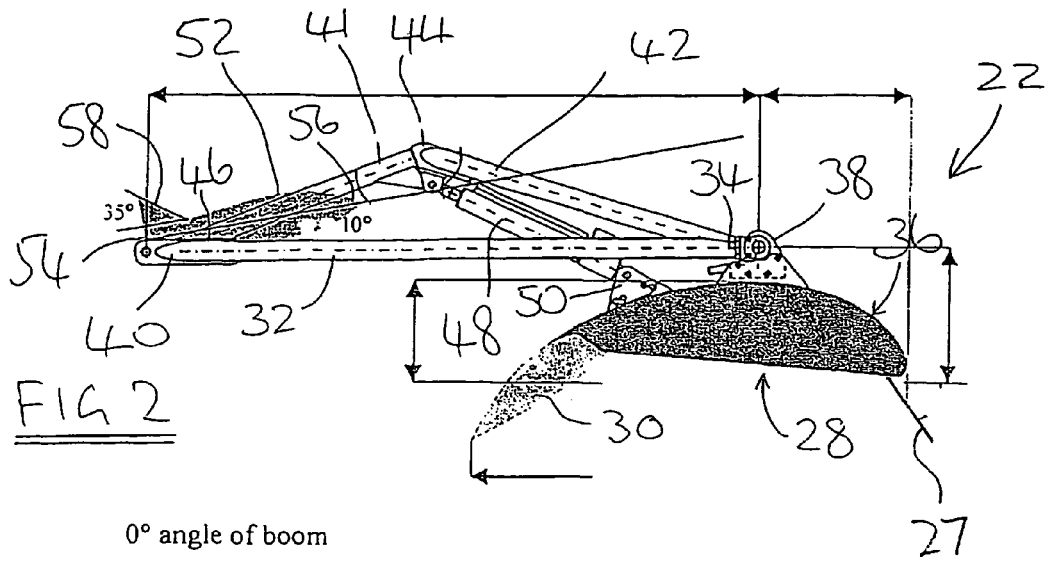
FIG. 2 is a somewhat schematic part-sectional view of a first embodiment of a deflector device in accordance with the present invention, for use in carrying out the survey of FIG. 1.

One of the deflector devices 22 is shown in more detail in FIG. 2. The deflector device 22 is similar in general principle to the deflector device of our U.S. Pat. No. 5,357,892, but is a much improved version of it. In particular, the deflector device 22 has a main wing-shaped body 28 which is coupled in use to a respective outer lead-in 20 via a towing bridle 27, and which corresponds to the deflector body 2 of U.S. Pat. No. 5,357,892. However, the main wing-shaped body 28 is of improved hydrodynamic cross-sectional shape and includes a fixed-angle trailing edge flap 29, both of which features enhance lift. Also, the main wing-shaped body 28 is provided with vortex controlling end plates (not shown) of the kind described in our PCT Patent Application No. PCT/FR99/02272, to reduce drag and improve stability, and is largely made of titanium to reduce weight.

Additionally, the angle lever 10 of U.S. Pat. No. 5,357,892 is replaced by a rearwardly extending boom 32, which is pivotally connected at one end 34 to the low pressure side 36 of the body 28 near the midpoint of that side of the body, at a mounting bracket 38. The other end 40 of the boom 32 has a towing eye (not shown) which is coupled to the forward end 24 of a respective one of the two outermost streamers 18.

Pivotal movement of the boom 32 is controlled by a mechanism comprising first and second struts 41, 42, which are pivotally connected to each other at 44 and to each end of the boom at 34 and 46, forming with the boom a triangle, and an extending hydraulic actuator strut 48 pivotally connected between the apex of the triangle, ie the pivotal connection point 44 of the struts 41, 42, and a pivotal connection point 50 positioned on the low pressure side 36 of the body 28 between its midpoint and its trailing edge. The actuator strut 48 is connected to be operated by a remotely-operable hydraulic control system (not shown) disposed within the body 28.

Figure 3:
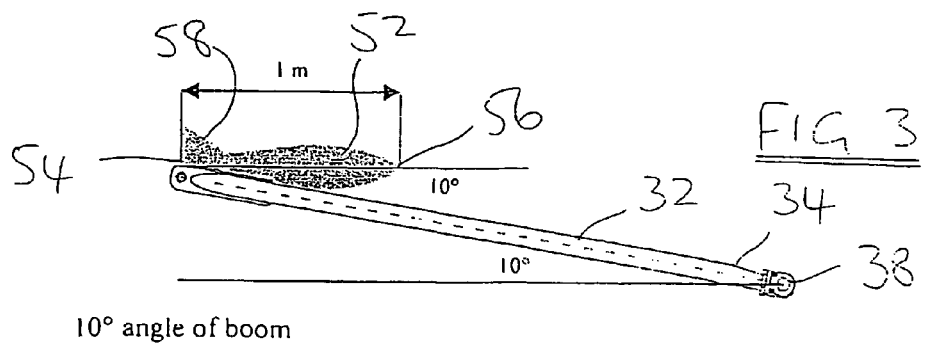
FIGS. 3 and 4 show different operating positions of part of the deflector device of FIG. 2.
Figure 4:
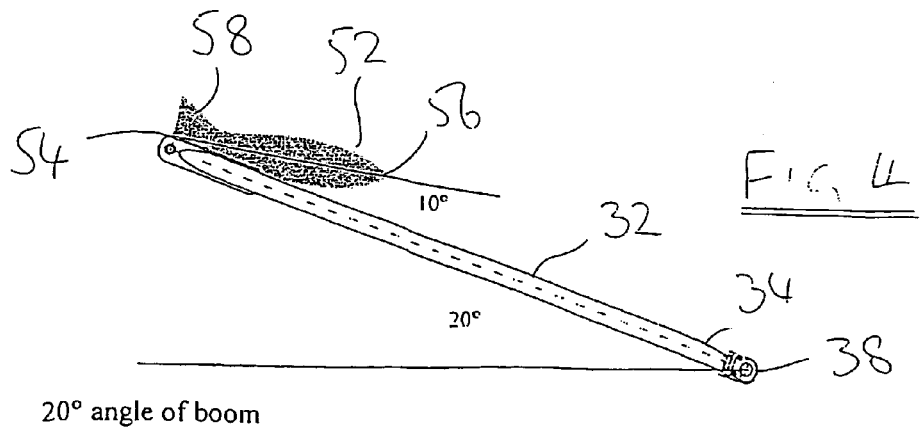

It will be appreciated that extension of the hydraulic actuator strut 48, from its unextended position of FIG. 2, will move the boom 32 outwardly from the low pressure side 36 of the body 28, from its closest position shown in FIG. 2. The extent of the outward movement is preferably about 20°, as shown in FIGS. 3 and 4.

In accordance with the present invention, an auxiliary wing-shaped body 52, which is much smaller than the body 28 in length, thickness and chord, is secured to the end 40 of the boom 32 with its longitudinal axis (which lies in a plane perpendicular to the plane of FIG. 2) extending parallel to the longitudinal axis of the body 28. The body 52 is fixedly secured to the boom 32 at or near the midpoint of its trailing edge 54, and its leading edge 56 is inclined away from the body 28 such that the chord of the body 52 (ie the line connecting its leading edge 56 and its trailing edge 54) is at an angle of about 10° to the boom 32. This angle is chosen because it is about half the angular extent of the movement of the boom 32.

The shape of the body 52 is designed to produce, in use, a sideways force in a direction approximately opposite to that produced by the body 28 (approximately opposite, because it will be appreciated that the direction of the force varies in use as the boom 32 moves). This sideways force is increased by providing the body 52 with a fixed trailing edge flap 58, angled away from the boom 32 at an angle of about 35°.

As the boom 32 is pivoted away from the body 28, the sideways, force produced by the body 52 acts as a restoring force, and thus varies the angle of the body 28 with respect to the direction of tow, so changing the lift produced by the body 28. This restoring force augments the restoring force produced by the drag of the towed streamers 18 (and in particular, reduces the effect of any stability-reducing variations or reductions in that drag). Indeed, the deflector device 22 will remain stable with no streamer attached, eg if its streamer 18 breaks or is severed at its forward end 24.

Figure 5:
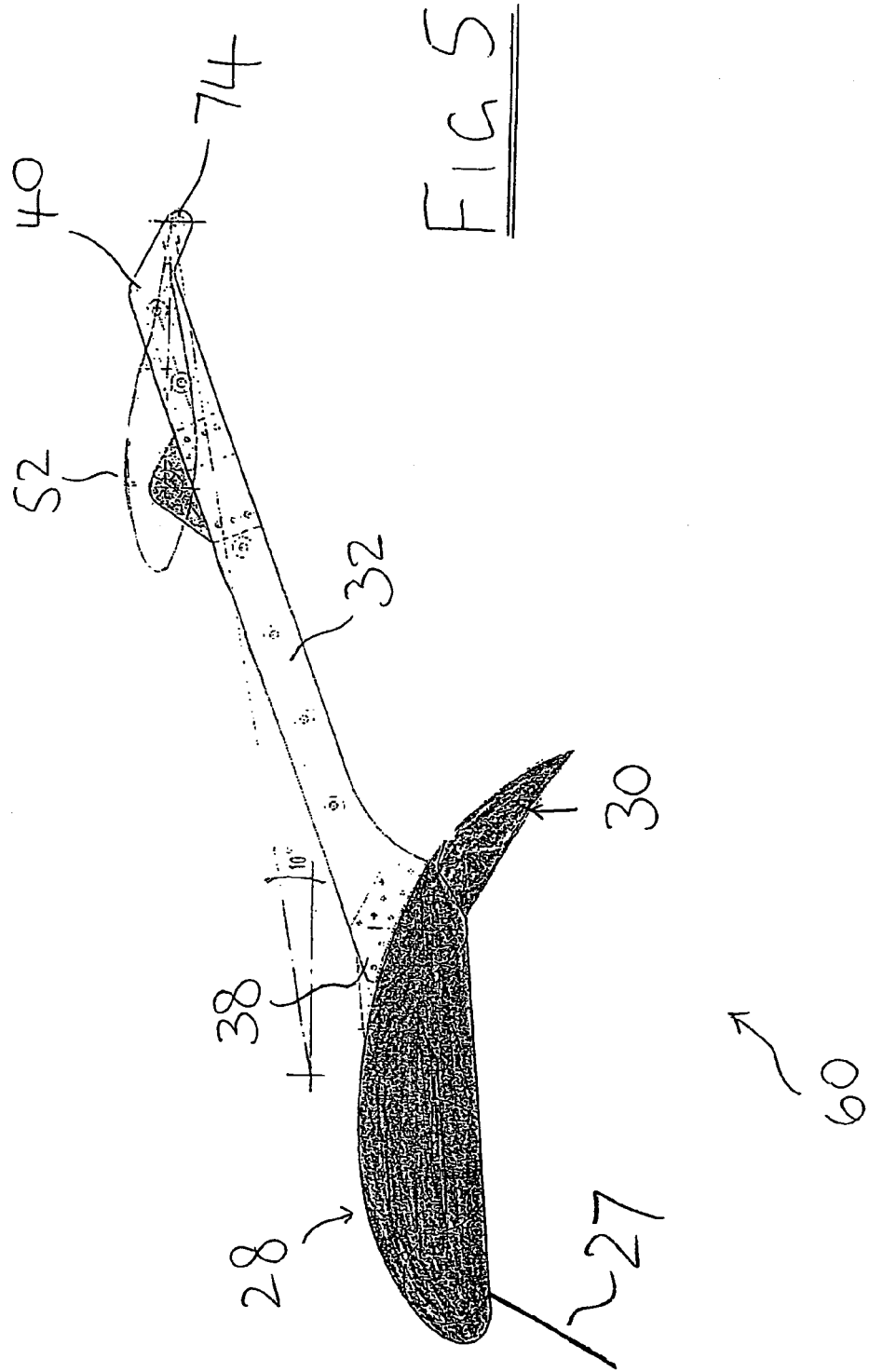
FIG. 5 is a somewhat schematic part-sectional view of a second embodiment of a deflector device in accordance with the present invention, for use in carrying out the survey of FIG. 1.
Figure 6:
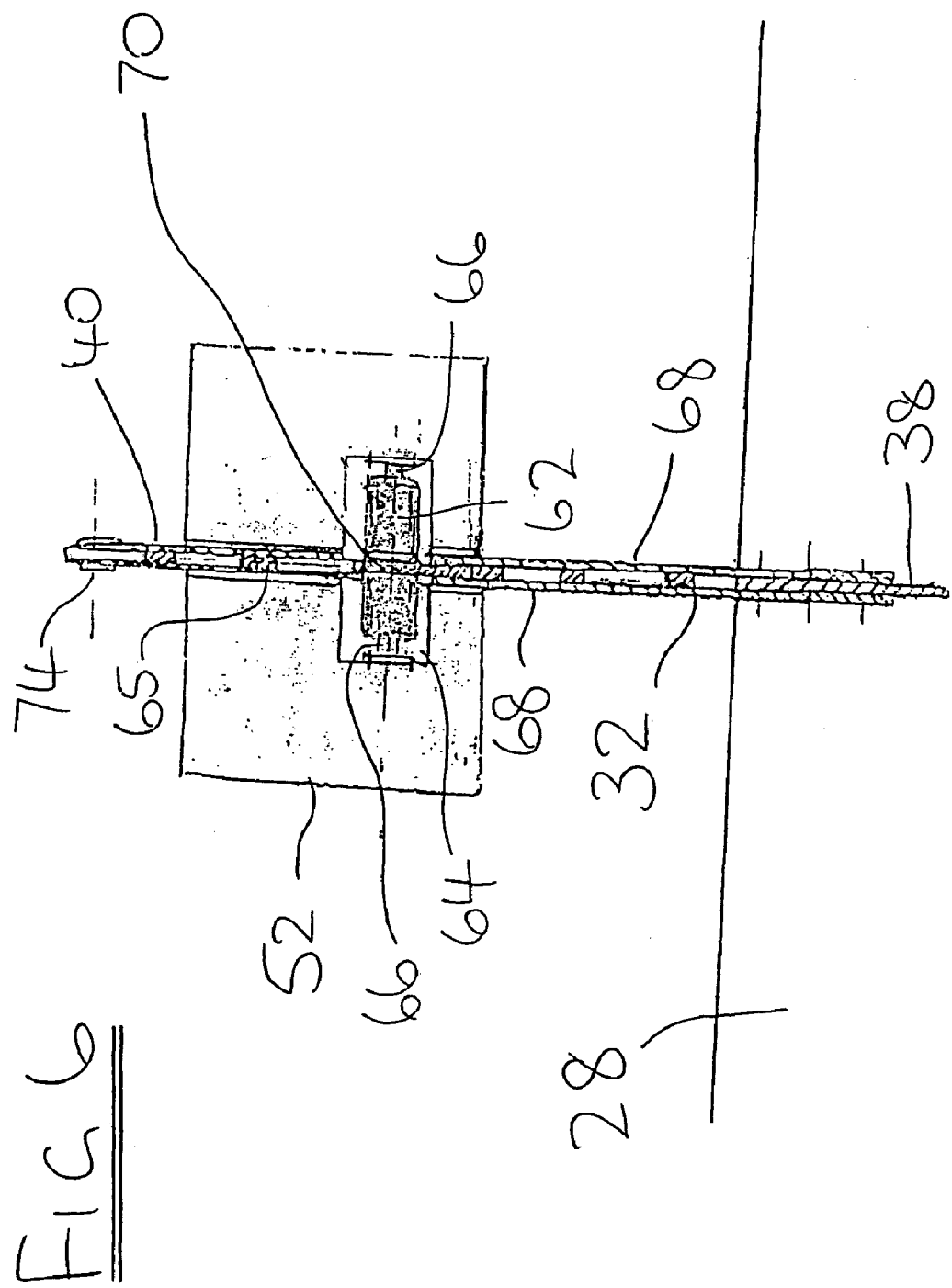
FIG. 6 is a front view of part of the deflector device of FIG. 5.

FIGS. 5 and 6 show at 60 an alternative embodiment of the deflector device 22 of FIGS. 2 to 4, with corresponding parts having the same reference numbers as were used in FIGS. 2 to 4. The principal difference between this alternative embodiment and the embodiment of FIGS. 2 to 4 is that in the deflector device 60, the boom 32 is secured at a fixed angle, typically about 10°, to the low pressure side 36 of the main wing-shaped body 28, while the angle of the chord of the auxiliary wing-shaped body 52 with respect to the boom 32 is variable by means of a remotely operable electric stepper motor 62.

As best seen in FIG. 6, the electric stepper motor 62 is secured to the boom 32 with its axis extending laterally of the boom, and is disposed in a-cut-out or aperture 64 in the auxiliary wing-shaped body 52. Coaxial drive shafts 66 protrude from each axial end of the motor 62 and are secured to the body 52 to rotate it about the common axis of the drive shafts. A slot 65 is provided in the body 52 between the aperture 64 and the trailing edge of the body, to accommodate the boom 32 as the body 52 is rotated by the motor 62. As an alternative to the apertured and slotted implementation of the body 52, the body 52 can be implemented in two separate but symmetrical halves disposed on respective sides of the boom 32 and each attached to a respective one of the drive shafts 66 of the motor 62.

The boom 32 is of sandwich construction: it is made of two similarly shaped plates 68 which are bolted together at intervals along their length and which sandwich between them both a mounting flange 70 of the motor 62 and the boom mounting bracket 38 secured to the low pressure side of the main wing-shaped body 28. Typically, the boom 32 is detached from the bracket 38 whenever the deflector device 60 is on the vessel 10, for ease of stowage.

As in the embodiment of FIGS. 2 to 4, the end 40 of the boom is provided with a towing eye, indicated at 74 in FIG. 5, for connection to a streamer 18. However, as mentioned earlier, since stability is no longer dependent upon a streamer 18 being connected to the end 40 of the boom 32, the towing eye 74 can be omitted, and the streamer 18 can be towed from the lead-in 20 at a point near the attachment point of the deflector device 60. The same is true for the deflector device 22.

It will be appreciated that varying the angle of the auxiliary wing-shaped body 52 of the deflector device 60 has the same effect as varying the angle of the boom 32 of the deflector device 22, ie it changes the angle of the main wing-shaped body 28 with respect to the direction of tow and so changes the lift produced by the main wing-shaped body. However, for the deflector device 60, less power is required to produce a given change in angle of the main wing-shaped body 28, because of the increased leverage provided by the position of the auxiliary wing-shaped body 52 towards the end 40 of the boom 32 (as opposed to the position of the hydraulically-operated actuator strut 48 of the deflector device 22). It is this which permits the use of the relatively low-powered electric stepper motor 62 in the deflector device 60, in place of the relatively more powerful hydraulic system which operates the mechanism based on the strut 48 in the deflector device 22. However, if desired, the electric stepper motor 62 can be replaced by a simple hydraulic actuator secured to the boom 32, since this also would not need to be as powerful as the hydraulic system which operates the mechanism based on the strut 48. An additional advantage of replacing the hydraulic system and the mechanism based on the strut 48 with the electric stepper motor 62 or a simple hydraulic actuator is the considerable weight saving which can be achieved.

It will be appreciated that many other modifications can be made to the described embodiments of the invention. In particular, the deflector devices 22 and 60 can be used with tows other than streamers, for example seismic sources.

Although the deflector devices 22 and 60 are adapted for use with separate floats, this is not an essential feature of the invention, since for example they can incorporate a float, as described in our co-pending United Kingdom Patent Applications Nos. 0023775.0 and 0025719.6. And although the invention has been described in relation to deflector devices whose lift can be varied by varying the angle of the device with respect to the direction of tow, it is also applicable in its broadest aspect to a fixed angle deflector device, eg of the kind referred to as a "door".

The invention claimed is:

1. A deflector device for use with a tow line between a towing vessel and a tow in water behind the vessel, the device comprising a principal wing-shaped body shaped to produce in use a sideways force which urges the tow line laterally with respect to the direction of movement of the towing vessel, a boom extending rearwardly from the principal wing-shaped body, and an auxiliary wing-shaped body, smaller than the principal wing-shaped body, secured to the end of the boom remote from the principal wing-shaped body and shaped so as to produce in use a sideways force in generally the opposite direction to that produced by the principal wing-shaped body.

2. A deflector device as claimed in claim 1, further comprising remotely-operable means for adjusting the angle between the boom and the principal wing-shaped body to vary the sideways force produced by the principal wing-shaped body.

3. A deflector device as claimed in claim 2, wherein the auxiliary wing-shaped body is secured to the boom at or near its trailing edge, with its chord extending outwardly from the boom, on the side thereof opposite to the principal wing-shaped body, at an angle to the boom substantially equal to half the angle through which the boom is adjustable.

4. A deflector device as claimed in claim 2 or claim 3, wherein the remotely-operable means includes a hydraulically-actuated telescopic strut.

5. A deflector device as claimed in claim 1, wherein the angle between the boom and the principal wing-shaped body is substantially fixed, and further comprising remotely operable means for varying the angle of the auxiliary wing-shaped body to vary the sideways force produced by the auxiliary wing-shaped body, and thereby vary the sideways force produced by the principal wing-shaped body.

6. A deflector device as claimed in claim 5, wherein the remotely-operable means comprises an electric motor.

7. A deflector device as claimed in claim 5, wherein the remotely-operable means comprises a hydraulic actuator.

8. A deflector device as claimed in claim 1, wherein the auxiliary, wing-shaped body is provided with a trailing edge flap angled away from the boom, typically at about 35°.

9. A deflector device as claimed in claim 1, wherein the end of the boom remote from the principal wing-shaped body connects to the tow.

10. A method of performing a marine seismic survey, the method including towing a plurality of laterally spaced seismic streamers over an area to be surveyed, wherein the lateral position of at least one of the streamers is controlled by a deflector device comprising a principal wing-shaped body shaped to produce in use a sideways force which urges the tow line laterally with respect to the direction of movement of the towing vessel, a boom extending rearwardly from the principal wing-shaped body, and an auxiliary wing-shaped body, smaller than the principal wing-shaped body, secured to the end of the boom remote from the principal wing-shaped body and shaped so as to produce in use a sideways force in generally the opposite direction to that produced by the principal wing-shaped body.

11. The method of claim 10 comprising varying the angle between the boom and the principal wing-shaped body to vary the sideways force produced by the principal wing-shaped body by adjusting a remotely-operable means for adjusting the angle.

12. The method of claim 11 comprising securing the auxiliary wing-shaped body to the boom at or near its trailing edge, with its chord extending outwardly from the boom, on the side thereof opposite to the principal wing-shaped body, at an angle to the boom substantially equal to half the angle through which the boom is adjustable.

13. The method of claim 11 wherein the remotely-operable means includes a hydraulically-actuated telescopic strut, and the method further comprises actuating the hydraulically-actuated telescopic strut.

14. The method of claim 11 comprising substantially fixing the angle between the boom and the principal wing-shaped body, remotely varying the angle of the auxiliary wing-shaped body to vary the sideways force produced by the auxiliary wing-shaped body, thereby varying the sideways force produced by the principal wing-shaped body.

15. The method of claim 11 comprising providing the auxiliary, wing-shaped body with a trailing edge flap, and angling the trailing edge flap away from the boom, typically at about 35°.

* * * * *